METHOD OF MAKING MAGNETIC BODY WITH PATTERN OF IMBEDDED NON-MAGNETIC MATERIAL
Filed Oct. 23, 1963.

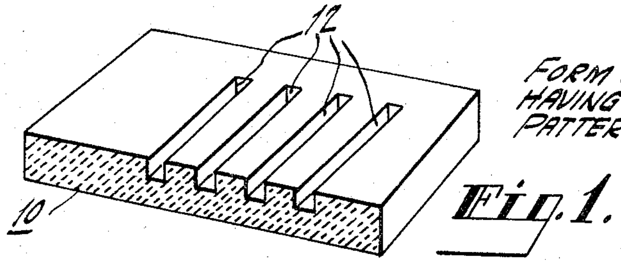

FORM GREEN FERRITE SHEET HAVING DEPRESSIONS IN A DESIRED PATTERN.

FIG. 1.

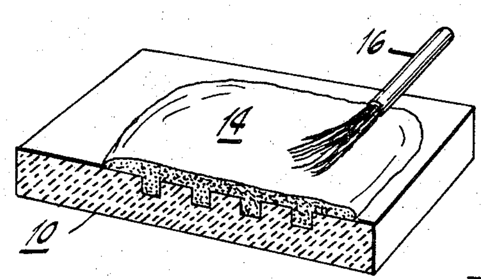

APPLY SLURRY OF NON-MAGNETIC (CONDUCTIVE) PARTICLES MIXED WITH A SOLUTION (AQUEOUS) OF BINDER (CARBONACEOUS)

FIG. 2.

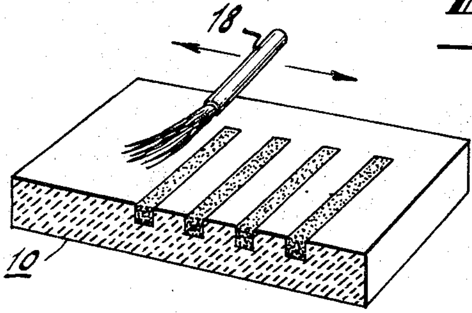

DRY AND BRUSH OFF DRIED LIGHTLY-BOUND PARTICLES FROM SURFACE ONLY.

FIG. 3.

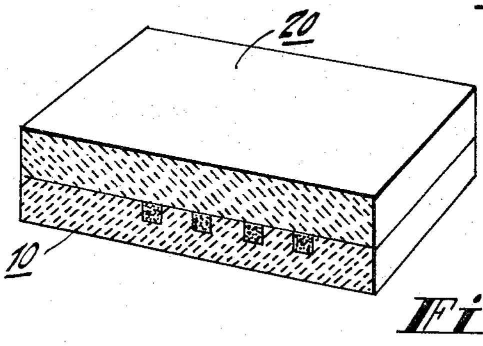

LAMINATE WITH ANOTHER SHEET OF GREEN FERRITE AND FIRE TO FORM UNITARY BODY OF SINTERED MAGNETIC FERRITE HAVING PATTERN OF IMBEDDED (CONDUCTIVE) MATERIAL.

FIG. 4.

INVENTORS
JOSEPH A. KULICZKOWSKI &
CHANDLER WENTWORTH

BY Carl V. Olson
Attorney

United States Patent Office 3,333,334

Patented Aug. 1, 1967

3,333,334

METHOD OF MAKING MAGNETIC BODY WITH PATTERN OF IMBEDDED NON-MAGNETIC MATERIAL

Joseph A. Kuliczkowski, Trenton, and Chandler Wentworth, Princeton, N.J., assignors to Radio Corporation of America, a corporation of Delaware Filed Oct. 23, 1963, Ser. No. 318,292
3 Claims. (Cl. 29—604)

This invention relates to methods of making articles of magnetic material with an imbedded pattern of non-magnetic material which may be conductive or non-conductive, and particularly to methods of making such articles in which the magnetic material is sintered magnetic ferrite. While not limited thereto, the invention is particularly useful in the construction of magnetic memories and electromagnetic logic devices for use in electronic data processing equipment.

Magnetic memory element arrays presently enjoying widespread commercial use are in the form of rows and columns of ferrite magnetic cores which have been manually threaded with row and column conductors. There is a demand for magnetic memory arrays which are faster in operation by virtue of having smaller magnetic memory elements than can be wired by hand. There is also a demand for magnetic memory arrays which are capable of construction in commercial quantities by less expensive batch fabrication techniques.

It has been proposed to construct an array of magnetic memory elements by forming thin sheets of "green" (i.e. unfired) ferrite, printing conductive patterns on the sheets, laminating a plurality of such sheets with the conductive patterns in a desired registry and firing the lamination to provide a unitary homogeneous sintered ferrite sheet having a desired two-state magnetic characteristic. The imbedded conductors cooperate with surrounding ferrite to constitute memory elements that are addressible for the writing in, and reading out, of digital information.

The firing of green ferrite to produce a sintered ferrite having the desired magnetic properties is accomplished at a temperature of about 1200° C. and is accompanied by a shrinkage of from 5 to 30 percent in physical dimensions. Non-magnetic material imbedded in the ferrite during firing must be capable of withstanding the firing temperature, and must not diffuse into the ferrite. Further, the imbedded material must not interfere with the shrinkage of the ferrite because such interference causes the ferrite to crack.

It is a general object of this invention to provide an improved method of making a sintered body or sheet of uniform, homogeneous, void-free magnetic material (such as ferrite) having an accurately dimensioned and spaced pattern of non-magnetic material imbedded therein. The non-magnetic material may be electrically conductive or non-conductive.

According to one specific example of the invention, a body of magnetic material is made from two green ferrite sheets one of which has a surface with a depression pattern corresponding with a desired pattern of imbedded non-magnetic conductive material by the following steps: A layer of a slurry is applied to said surface of the one green ferrite sheet, the slurry including non-magnetic conductive particles, having dimensions in the range of about from 0.5 to 5 microns, which are mixed in an aqueous solution having, by weight, 0.1 to 2 percent of a wetting agent and 2 to 20 percent of a carbonaceous binder comprising about 99 percent granulated sugar and 1 percent honey. The slurry is allowed to dry leaving lightly-bound non-magnetic conductive particles on the surface and in said depressions. The particles are brushed from the surface leaving the depressions filled with particles. The two ferrite sheets are then laminated and fired to drive off the binder and form a homogeneous body of sintered magnetic ferrite having an imbedded pattern of compacted non-magnetic conductive particles.

These and other objects and aspects of the invention will be apparent to those skilled in the art from the following more detailed description taken in conjunction with the appended drawing, wherein FIGS. 1 through 4 illustrate successive steps of a method which follows the teachings of this invention.

Referring now in greater detail to the drawing, FIG. 1 is a perspective view of a section of a dried leather-like sheet 10 of green ferrite having a pattern of narrow-width depressions 12 conforming with a desired pattern of conductors to be imbedded in a magnetic ferrite body. The ferrite sheet 10 may have a thickness in the range of about from 0.001 to 0.020 inch. The depressions 12 each may be about from 0.0005 to 0.003 inch in transverse dimensions (height and width), may be 2 or 3 inches in length, and may be spaced apart from each other uniformly by amounts in the range of from about 0.005 to 0.10 inch.

The green ferrite sheet 10 with depressions 12 may be formed by spreading a ferrite slurry, by means of a doctor blade, to a uniform thickness over a plate having a raised pattern. After drying for about five minutes, the ferrite slurry solidifies and may be removed from the plate as a thin flexible leather-like sheet of solidified green ferrite having a depression pattern where conductive material is desired.

By way of example, the ferrite slurry may be made in the proportions of 65 grams of a calcined ferrite made of zinc, magnesium, manganese and iron oxides, 13 grams of an organic binder and 52 grams of a solvent such as methyl ethyl ketone or toluene. The binder may be one sold under the trade name "VYNS" by the Union Carbide Corporation. Another binder which is suitable when used in a smaller proportion is polyvinyl butyral sold under the trade name "Butvar" by Shawinigan Resins, Springfield, Mass. The materials are milled in a ball mill or a grinding mill and additional solvent is added to achieve a viscosity of about 900 centipoises, which is suitable for doctor blading purposes.

Alternatively, the "doctor bladed" green ferrite sheet 20 may be created over a raised pattern by means of a calendering roll, or by means of a spray gun.

FIG. 2 illustrates the applying of a slurry 14 of conductive particles and a vehicle into the surface of the ferrite sheet 10 having depressions 12 by means of a brush 16. The conductive particles should have particle sizes much smaller than the minimum dimension of the depression 12. The brush 16 may, for example, be an ordinary water color brush, preferably having bristles with a diameter greater than the widths of the depressions 12. The slurry 14 is applied with a sufficient thickness so that the depressions are filled to excess after the slurry dries.

The slurry 14 includes particles of a non-magnetic conductive refractory metal mixed in a binder solution. The conductive particles in the slurry 14 are preferably selected from the class of refractory metals including palladium, platinum, rhodium and rhenium, or alloys or mixtures of these refractory metals with gold or silver. The refractory metals have a sufficiently high melting point to withstand a final step in the process at which time the ferrite is fired. The conductive particles may have a size of about from one micron (about 0.00004 inch) to five microns.

The binder solution solvent may be distilled water to which is added a small percentage, such as between 0.1 to 2 percent by weight, of a wetting agent. The wetting agent may be trimethyl nonyl ether of polyethylene glycol sold by Union Carbide Chemicals Company under the trade name "Tergitol." The water and wetting agent have no undesirable effect on the previously-mentioned plastic binders used to hold together the ferrite particles of the green ferrite sheet. Also, water is a solvent which is volatile enough to evaporate in a relatively short time. The binder, which is dissolved in the solvent, may be a carbonaceous crystallizing material soluble in the solvent used. A presently preferred and readily available binder is household granulated sugar. An aqueous binder solution may contain between 2 and 20 percent, by weight, of sugar. A small amount, such as about 1 percent, of honey may be added to the aqueous sugar solution to impart a slightly more adhesive quality.

The application of the slurry 14 to the surface of the green ferrite sheet 10 may be accomplished with an ordinary brush. The conductive particles in the mixture normally do not go into suspension in the aqueous binder solution. The conductive particles may occupy the lower 20 percent of the volume of the container. The solution should be agitated to insure that the brush picks up a mixture including conductive particles from the container. The agitation may be accomplished by the brush itself when it is inserted in to the container. The green ferrite sheet is sufficiently porous so that the water including the wetting agent tends to flow down through the ferrite sheet. The interstices in the ferrite are, however, small enough so that conductive particles having a size of one micron cannot enter the ferrite material. The ferrite acts somewhat as a filter which passes the sugar water and traps and conductive particles. Air bubbles are thus avoided.

The deposited slurry is allowed to dry. Evaporation of water from the top surface of the deposited slurry takes place in ten or fifteen minutes at normal room temperature and humidity. Evaporation of the water leaves the sugar in the form of tiny crystals. The sugar crystals are very small compared with the size of the conductive particles. The sugar crystals adhere to the conductive particles due to their own adhesive quality and to the adhesive quality of the honey in the solution. The dried sugar crystals and honey form a weak or light bond between the conductive particles themselves and between the conductive particles and the somewhat porous ferrite. The strength of the bond can be carried by varying the proportion of honey and sugar included in the original solution. The adhesive quality is made to be just sufficient to hold the conductive particles on the surface and in the depressions against dislodgement due to handling the ferrite sheet. The adhesion should not be so great as to interfere with the execution of the next-following step in the method.

FIG. 3 shows the next step in the method wherein the lightly-bound conductive particles on the surface of the ferrite sheet are removed by means of a brush 18, leaving the particles in the depressions. The motion given to the brush 18 in removing the excess particles is transverse to the direction of the elongated depressions. The adhesion of the particles to the ferrite is such that the brush is effective in removing particles from the top surface of the ferrite sheet but does not remove particles lodged and lightly-bound in the depressions.

The resulting green ferrite sheet 20 with lightly-bound conductive particles in the depressions is laminated with with another green ferrite sheet 20 so that the pattern of conductive particles is imbedded between the two sheets, as shown in FIG. 4. Lamination is accomplished with a pressure of about 900 pounds per square inch for about 10 minutes at a temperature between about 90° C. and 105° C. This laminating temperature is not high enough to cause a sintering of the ferrite, but is sufficiently high to facilitate a physical bonding of the two green ferrite sheets.

The pressure-laminated green ferrite sheet is subjected to a temperature in the range of from 200° to 400° C. to burn out the binder, and then to a temperature which is sufficiently high to sinter the green ferrite and cause it to assume the desired magnetic properties. The sintering temperature of most suitable ferrites is known and may be about 1200° C. After sintering, the sheet may be air quenched at room temperature and/or may be subsequently annealed in nitrogen at a temperature of 1100° C. for one hour. The foreging is merely illustrative; the particular ferrite composition employed should be given the known heat treatment appropriate for producing the desired electro-magnetic characteristics.

The heat treatment results in a shrinkage of the ferrite by an amount such as from 5 to 30 percent. The heat treatment, in driving off the sugar binder on the conductive particles, also results in a shrinkage of the volume occupied by the conductive particles. The proportion of sugar binder in the original solution is selected so that the shrinkage of the volume occupied by the conductive particles is substantially equal to, and preferably is a little less than, the shrinkage of the surrounding ferrite. This results in a compacting of the conductive particles by the shrinking ferrite so that the particles are forced into intimate contact to form a good electrical conductor. Another result is the avoidance of air spaces which would, if present, interfere with the uniformity of the electro-magnetic characteristics of the resulting memory elements.

The conductivity of the conductor formed by the compacted metallic particles is enhanced by the use of a carbonaceous binder such as sugar. The high firing temperature liberates the carbon of the sugar molecules, and the liberated carbon unites with oxygen present to form carbon monoxide. This provides a reducing action which substantially prevents an oxydation of the surfaces of the conductive particles. The electrical contact resistance between the particles is thus not unduly impaired by a layer of metal oxide.

The final product consists of a sintered magnetic ferrite body having imbedded conductors. The ferrite body made from separate green ferrite sheets 10 and 20 is unitary, homogeneous and free from voids or cracks near the conductors. The conductors have the desired high dimensional and locational accuracy. While a unitary ferrite body made from only two laminated ferrite sheets 10 and 20 has been described, the ferrite body may be made from any desired number of separate ferrite sheets with different patterns of conductive material at the various interfaces of the sheets.

What has been said regarding the method of constructing a sheet of magnetic material having a pattern of imbedded conductive material applies also where an imbedded pattern of non-conductive as well as non-magnetic material is desired. In this case, the slurry 14 is made using particles of the desired material in the binder solution. Magnesium oxide and tin oxide, in powder form, are suitable non-magnetic ceramic materials for use in making the mixture. When the ferrite with an imbedded non-magnetic ceramic powder pattern is fired, the ferrite sinters and shrinks and the volume occupied by the ceramic particles also shrinks as the sugar binder is driven off.

The final product may be multi-layered and include patterns of conductive material at some interfaces of ferrite layers and non-magnetic ceramic at other interfaces. The conductive patterns may be used for carrying electric currents in the performance of write and read operations in a magnetic memory array, and the non-magnetic ceramic pattern may serve to restrict flux paths. Conductive patterns may also be used for electrostatic shielding and for restricting flux paths.

What is claimed is:

1. In a method of forming a body of magnetic material from two green ferrite sheets one of which has a surface with a depression pattern corresponding with a desired pattern of imbedded non-magnetic conductive material, the steps of applying a layer of a slurry to said surface of the one green ferrite sheet, said slurry including non-magnetic conductive particles which have dimensions in the range of about from 0.5 to 5 microns and which are mixed in an aqueous solution having, by weight, 0.1 to 2 percent of a wetting agent and 2 to 20 percent of a carbonaceous binder comprising about 99 percent granulated sugar and 1 percent honey, allowing the slurry to dry leaving lightly-bound non-magnetic conductive particles on said surface and in said depressions, brushing the particles from said surface leaving the depressions filled with particles, and laminating and firing the two ferrite sheets to drive off the binder and form a homogeneous body of sintered magnetic ferrite having an imbedded pattern of compacted non-magnetic conductive particles.

2. The method of forming a body of magnetic material having a desired pattern of imbedded non-magnetic material, comprising the steps of forming a green ferrite sheet with depressions in the desired pattern on a surface of the sheet, applying a layer of a slurry to said surface of the green ferrite sheet, said slurry including non-magnetic particles which have dimensions in the range of about from 0.5 to 5 microns and which are mixed in an aqueous solution having a wetting agent and a carbonaceous binder, allowing the slurry to dry leaving lightly-bound non-magnetic particles on said surface and in said depressions, brushing the particles from said surface leaving the depressions filled with the particles, placing another green ferrite sheet on said surface having filled depressions, and pressure laminating the two green ferrite sheets, and firing the lamination to drive off said binder and form a homogeneous body of sintered magnetic ferrite having an imbedded pattern of compacted non-magnetic particles.

3. The method of forming a body of magnetic material having a desired pattern of imbedded non-magnetic conductors, comprising the steps of forming a green ferrite sheet with narrow-width depressions in the desired pattern on a surface of the sheet, applying a layer of slurry to said surface of the green ferrite sheet, said slurry including non-magnetic conductive particles which have dimensions in the range of about from 0.5 to 5 microns and which are mixed in an aqueous soltuion having, by weight, 0.1 to 2 percent of a wetting agent and 2 to 20 percent of a carbonaceous binder comprising about 99 percent granulated sugar and 1 percent honey, allowing the slurry to dry leaving lightly-bound non-magnetic conductive particles on said surface and in said depressions, brushing the particles from said surface leaving the depressions filled with the particles, placing another green ferrite sheet on said surface having filled depressions, and pressure laminating the two green ferrite sheets, and firing the lamination to drive off said binder and form a homogeneous body of sintered magnetic ferrite having an imbedded pattern of compacted non-magnetic material conductive particles.

References Cited

UNITED STATES PATENTS

| | | | |
|---|---|---|---|
| 2,457,806 | 1/1949 | Crippa. | |
| 2,641,556 | 6/1953 | Robinson | 117—46 |
| 3,040,301 | 6/1962 | Howatt et al. | 29—155.5 |
| 3,077,021 | 2/1963 | Brownlow | 25—156 |
| 3,192,086 | 6/1965 | Gyurk | 75—208 |
| 3,247,573 | 4/1966 | Noack | 29—155.5 |

JOHN F. CAMPBELL, *Primary Examiner.*

JACOB STEINBERG, *Examiner.*

P. M. COHEN, *Assistant Examiner.*